US011163426B2

(12) United States Patent
Liu (10) Patent No.: US 11,163,426 B2
(45) Date of Patent: Nov. 2, 2021

(54) INTERACTION POSITION DETERMINATION METHOD AND SYSTEM, STORAGE MEDIUM AND SMART TERMINAL

(71) Applicant: Guohua Liu, Shenzhen (CN)

(72) Inventor: Guohua Liu, Shenzhen (CN)

(*) Notice: Subject to any disclaimer, the term of this patent is extended or adjusted under 35 U.S.C. 154(b) by 0 days.

(21) Appl. No.: 16/791,737

(22) Filed: Feb. 14, 2020

(65) Prior Publication Data

US 2020/0183556 A1 Jun. 11, 2020

Related U.S. Application Data

(63) Continuation of application No. PCT/CN2018/099219, filed on Aug. 7, 2018.

(30) Foreign Application Priority Data

Aug. 14, 2017 (CN) .......................... 201710691663.6

(51) Int. Cl.
*G06F 3/0484* (2013.01)
*G06F 3/01* (2006.01)
(Continued)

(52) U.S. Cl.
CPC ............ *G06F 3/0484* (2013.01); *G06F 3/011* (2013.01); *G06F 3/017* (2013.01); *G06F 3/0482* (2013.01);
(Continued)

(58) Field of Classification Search
CPC ........... G06K 9/00221; G06K 9/00335; G06K 9/00255; G06K 9/00355; G06F 3/011;
(Continued)

(56) References Cited

U.S. PATENT DOCUMENTS 8,659,548 B2 * 2/2014 Hildreth .............. G06F 3/04842
345/158
8,773,355 B2 * 7/2014 Perez ...................... G06F 3/011
345/158
(Continued)

FOREIGN PATENT DOCUMENTS

CN 101030321 9/2007
CN 102184014 9/2011
(Continued)

OTHER PUBLICATIONS

A non-translated document that appears to be search notes dated Mar. 25, 2019 was also attached—it has been added to the file record //.

(Continued)

*Primary Examiner* — Amy M Levy
(74) *Attorney, Agent, or Firm* — Hamre, Schumann, Mueller & Larson, P.C.

(57) ABSTRACT

The present invention relates to an interaction position determination method, comprising: recognising a gesture image in a target area, and acquiring current position information corresponding to the gesture image in a display screen of a smart terminal; when it is detected that a gesture corresponding to the gesture image is a pre-set activation gesture, activating an interaction control response area according to the gesture image; and determining a target position of the interaction control response area according to the current position information. By means of using a gesture image to activate an interaction control response area and determining the position of the interaction control response area according to position information about the gesture image, the convenience of an operation is improved. Also provided are an interaction position determination system, a storage medium and a smart terminal.

7 Claims, 6 Drawing Sheets

(51) Int. Cl.
  *G06K 9/00* (2006.01)
  *G06F 3/03* (2006.01)
  *G06F 3/0482* (2013.01)

(52) U.S. Cl.
  CPC ..... *G06K 9/00221* (2013.01); *G06K 9/00335* (2013.01); *G06F 3/0304* (2013.01)

(58) Field of Classification Search
  CPC ...... G06F 3/017; G06F 3/0484; G06F 3/0482; G06F 3/0304; H04N 21/42204; H04N 21/431
  See application file for complete search history.

(56) References Cited

U.S. PATENT DOCUMENTS

| | | | |
|---|---|---|---|
| 9,250,707 B2 | 2/2016 | Choi et al. | |
| 2011/0001813 A1* | 1/2011 | Kim | G06K 9/00355 |
| | | | 348/77 |
| 2014/0089849 A1 | 3/2014 | Choi et al. | |
| 2014/0365927 A1* | 12/2014 | Sakai | G06F 3/0484 |
| | | | 715/764 |
| 2016/0054807 A1* | 2/2016 | Flagg | G06F 3/0484 |
| | | | 345/158 |
| 2016/0170491 A1 | 6/2016 | Jung | |
| 2018/0011543 A1* | 1/2018 | Funami | G06F 9/453 |

FOREIGN PATENT DOCUMENTS

| | | | |
|---|---|---|---|
| CN | 102508655 | 6/2012 | |
| CN | 103686269 | 3/2014 | |
| CN | 104914982 | 9/2015 | |
| CN | 106896907 | 6/2017 | |
| CN | 107493495 | 12/2017 | |
| GN | 101437124 | 5/2009 | |
| GN | 102831404 | 12/2012 | |
| GN | 106547468 | 3/2017 | |
| WO | WO-2010087796 A1 * | 8/2010 | ......... G06K 9/00335 |

OTHER PUBLICATIONS

International Search Report issued for International Patent Application No. PCT/CN2018/099219, dated Oct. 25, 2018, 5 pages including English translation.

* cited by examiner

FIG. 8

INTERACTION POSITION DETERMINATION METHOD AND SYSTEM, STORAGE MEDIUM AND SMART TERMINAL

TECHNICAL FIELD

The present disclosure relates to the technical field of human-computer interaction through smart terminals, and in particular, to a method, a system, a storage medium, and a smart terminal for interaction position determination.

BACKGROUND

With continuous development of science and technology and continuous improvement of people's life quality, televisions gradually tend to be intelligentized. In order to meet diverse demands of users, more and more applications have been used in smart televisions. However, for a traditional smart television, a menu bar or prompt information is usually displayed at a fixed position. When the smart television has a large display screen, it is inconvenient for the user to operate the menu bar, which affects the effectiveness of interaction between the user and the smart television.

SUMMARY

Based on the above and in order to solve the above problems, it is necessary to provide a method, a system, a storage medium, and a smart terminal for interaction position determination, which determine a target position of interaction control response area according to a gesture image and a gesture image position based on gesture recognition, to improve convenience of operation.

A method for interaction position determination includes: recognizing a gesture image within a target region, and acquiring current position information corresponding to the gesture image in a display screen of a smart terminal; activating an interaction control response area according to the gesture image when a gesture corresponding to the gesture image is detected as a preset activation gesture; and determining a target position of the interaction control response area according to the current position information.

In an embodiment, the activating the interaction control response area according to the gesture image includes: acquiring current state information corresponding to the smart terminal, determining corresponding function information according to the current state information, and generating corresponding target interaction control response information according to the function information; and activating the target interaction control response area corresponding to the target interaction control response information according to the gesture image.

In an embodiment, after determining the target position of the interaction control response area according to the current position information, the method includes: detecting a gesture operation acting on the target position, and triggering a corresponding interaction control instruction according to the gesture operation; and controlling the smart terminal to perform a corresponding operation according to the interaction control instruction.

In an embodiment, the method for interaction position determination further includes: recognizing a face image within the target region, and acquiring first position information of the face image on the display screen of the smart terminal; acquiring a face image size corresponding to the face image; determining a current distance between a user and the display screen of the smart terminal according to the face image size; acquiring a preset distance range corresponding to the distance, and determining a target display size of interaction information according to the preset distance range; determining a target display position of the interaction information according to the first position information, and displaying the interaction information at the target display position according to the target display size.

In an embodiment, the determining the target display position of the interaction information according to the first position information includes: acquiring the number of recognized face images within the target region; acquiring current position information corresponding to each face image when the number of the face images is more than one; and determining the target display position in accordance with a preset rule according to the current position information corresponding to each face image.

A system for interaction position determination includes: a gesture recognition module configured to recognize a gesture image within a target region, and acquire current position information corresponding to the gesture image in a display screen of a smart terminal; an activation module configured to activate an interaction control response area according to the gesture image when a gesture corresponding to the gesture image is detected as a preset activation gesture; and a target position determination module is configured to determine a target position of the interaction control response area according to the current position information.

In an embodiment, the activation module is further configured to acquire current state information corresponding to the smart terminal, determine corresponding function information according to the current state information, generate corresponding target interaction control response information according to the function information, and activate the target interaction control response area corresponding to the target interaction control response information according to the gesture image.

In an embodiment, the system for interaction position determination further includes: a control module is configured to detect a gesture operation acting on the target position, and trigger a corresponding interaction control instruction according to the gesture operation, and control the smart terminal to perform a corresponding operation according to the interaction control instruction.

In an embodiment, the system for interaction position determination further includes: a face recognition module configured to recognize a face image within a target region, and acquire first position information of the face image on the display screen of the smart terminal; a processing module configured to acquire a face image size corresponding to the face image, and determine a current distance between a user and the display screen of the smart terminal according to the face image size; a display size determination module configured to acquire a preset distance range corresponding to the distance, and determine a target display size of interaction information according to the preset distance range; and a display module configured to determine a target display position of the interaction information according to the first position information, and display the interaction information at the target display position according to the target display size.

In an embodiment, the face recognition module is further configured to acquire the number of the recognized face images within the target region.

A face position information acquisition module is configured to acquire current position information corresponding to each face image when the number of the face images is more than one.

A target display position determination module is configured to determine the target display position in accordance with a preset rule according to the current position information corresponding to each face image.

A computer readable storage medium with a computer program stored thereon. When the computer program is executed by a processor, the processor is caused to execute the following steps: recognizing a gesture image within a target region, and acquiring current position information corresponding to the gesture image in a display screen of a smart terminal; activating an interaction control response area according to the gesture image when a gesture corresponding to the gesture image is detected as a preset activation gesture; and determining a target position of the interaction control response area according to the current position information.

A smart terminal includes one or more processors, a memory and one or more programs stored on the memory and configured to be executed by the one or more processors. The program is used to implement the following steps: recognizing a gesture image within a target region, and acquiring current position information corresponding to the gesture image in a display screen of a smart terminal; activating an interaction control response area according to the gesture image when a gesture corresponding to the gesture image is detected as a preset activation gesture; and determining a target position of the interaction control response area according to the current position information.

According to the method, system, storage medium and smart terminal for interaction position determination, the interaction control response area is activated by recognizing the gesture image within the target region, and the target position corresponding to the interaction control response area is determined according to the current position information of the gesture image. The target position corresponding to the interaction control response area is determined according to the current position of the recognized gesture image on the display screen of the smart terminal. As the current position of the gesture image changes, the target position of the interaction control response area changes accordingly, which is convenient for users to perform operation on the interaction control response area and improves the convenience of operation.

DETAILED DESCRIPTION

In order to make the objectives, technical solutions and advantages of the present disclosure more clear and easier to understand, the present disclosure is further described in detail below with reference to the accompanying drawings and embodiments. It should be understood that the embodiments described here is only for explaining the present disclosure but not limiting the present disclosure.

Figure 1:
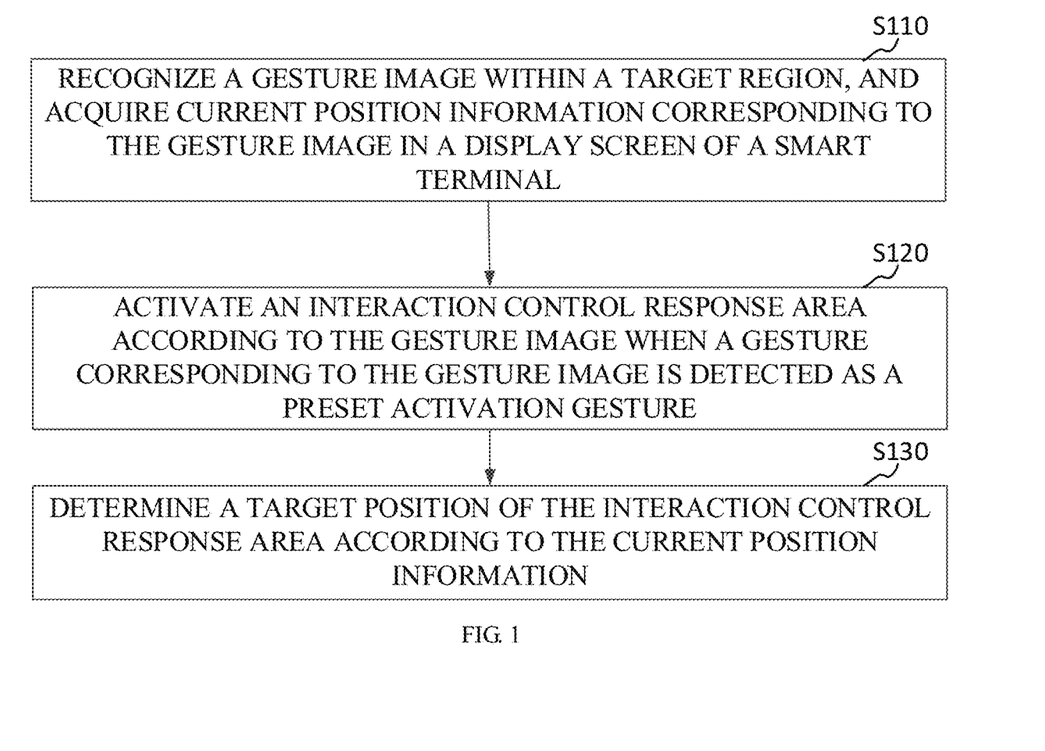
FIG. 1 is a flowchart illustrating a method for interaction position determination according to one embodiment.

As shown in FIG. 1, in one embodiment, a method for interaction position determination is provided, which includes the following content.

In step S110, a gesture image within a target region is recognized, and current position information corresponding to the gesture image in a display screen of a smart terminal is acquired.

The target region refers to an area in front of the display screen of the smart terminal, and the size of the target region is determined according to an acquisition angle of an image acquisition device. The image acquisition device may be a device included in the smart terminal, such as a camera of the smart terminal, or an external device that is connected to the smart terminal through a connection port. The gesture image is an image derived from a person's physical movement or state, such as the posture and state of a person's hand.

The smart terminal is a terminal that performs interaction with a user. The smart terminal may be a smart device such as a smart television, a tablet computer, or a mobile phone. The display screen of the smart terminal may be a display screen carried by the smart terminal itself or an external display screen. The current position information refers to information on a position at which the gesture image acquired at the current time by the image acquisition device is mapped to the display screen, and can reflect the position information of the gesture image in real time.

Specifically, the image acquisition device is used to acquire the gesture image. The acquired gesture image can be a static image or a dynamic image. When the user gesture is within the target region of the acquisition device, the acquisition device automatically searches for and captures the gesture image of the user, and recognize the gesture image according to a gesture image feature. According to gesture analysis in gesture recognition, shape features or motion trajectories of gestures can be acquired, and the current position information corresponding to the gesture image currently on the display screen of the smart terminal can be determined. The current position information of the recognized gesture image is acquired.

In step S120, an interaction control response area is activated according to the gesture image when a gesture corresponding to the gesture image is detected as a preset activation gesture.

The gesture image can be a static gesture image or a dynamic gesture image. The preset activation gesture, such as a sliding gesture, a scaling gesture, a lifting gesture or the like, can be preset according to demands. The preset activation gesture may include one or more gestures. A preset activation gesture library formed by the preset activation gestures can be stored in a server, and the acquired gesture images can be sent to the server for recognizing, or the preset activation gesture library can be stored in the smart terminal, and the smart terminal recognize the acquired gesture images directly.

The interaction control response area refers to an area capable of receiving a user operation and triggering a corresponding instruction according to the user operation. Further, the interaction control response area may be subjected to interface rendering, and function response information corresponding to the interaction control response area is displayed on the display screen of the smart terminal in a form of menu bar information, so as to prompt a function corresponding to the interaction response area. The menu bar information refers to a function bar of a computer and various terminals, including various kinds of function key information, which is convenient for the user to view. The interactive control response area may also not be subjected to interface rendering. After triggering the interaction control response area according to the gesture image, there is no corresponding menu bar information displayed on the display screen of the smart terminal, but an area of the smart terminal corresponding to the interaction control response area can still receive the user operation.

Specifically, the gesture image may be segmented and recognized. The gesture corresponding to the currently recognized gesture image may be compared with a preset activation gesture in the preset activation gesture library. When it is detected that a gesture corresponding to the recognized gesture image in the current target region is the same as the preset activation gesture, the corresponding interaction control response area on the display screen of the smart terminal is activated.

In step S130, a target position of the interaction control response area is determined according to the current position information.

Specifically, the target position of the interaction control response area is determined according to the current position information of the detected gesture image. For example, the corresponding position of the gesture image on the display screen of the smart terminal is regarded as the target position of the interaction control response area, and an area corresponding to the target position is capable of receiving the user operation. Further, if the functional information corresponding to the target response area is displayed in the form of menu bar information through interface rendering, a display position of the menu bar information is the target position corresponding to the interaction control response area.

In this embodiment, a method for mobile terminal control is provided. The interaction control response area is activated by recognizing the gesture image within the target region, and the target position corresponding to the interaction control response area is determined according to the current position information of the gesture image. The target position corresponding to the interaction control response area is determined according to the current position of the recognized gesture image on the display screen of the smart terminal. As the current position of the gesture image changes, the target position of the interaction control response area changes accordingly, which is convenient for users to perform operation on the interaction control response area and improves the convenience of operation.

In one embodiment, the step S120 includes: acquiring current state information corresponding to the smart terminal, determining corresponding function information according to the current state information, generating corresponding target interaction control response information according to the function information, and activating the target interaction control response area corresponding to the target interaction control response information according to the gesture image.

The current state information refers to information capable of reflecting the current operating state of the smart terminal, including information on content currently being played by the smart terminal, and state information about the playing. Different state information of the smart terminal corresponds to different function information. The interaction control response information refers to information that can respond to the user operation and can control the smart terminal to perform related operations.

Specifically, the current state information corresponding to the smart terminal is acquired, the corresponding function information is determined according to the current state information, and the corresponding target interaction control response information is generated according to the function information. For example, if the current state information of the smart terminal is an initial selection state, the corresponding function information is selectable program list information, such as the corresponding program list information generated according to the program classification of military, entertainment, technology or the like as interaction control response information, which is convenient for the user to select a program. Further, a face image may also be recognized, a registered user may be matched according to the recognized face image information, and the corresponding interaction control response information may be generated according to a recorded type of interest of the registered user. If the current state information of the smart terminal is a player interface of a certain program, the corresponding function information is fast-forward, reverse, volume increasing and decreasing, program switching or the like. The corresponding interaction control response information is generated according to the corresponding function information combination.

In other embodiments, the state information of the smart terminal and the interaction control response information may also be directly associated with each other, and the corresponding interaction control response information may be acquired through the current playing state.

Further, the target interaction control response area is determined according to the current position information of the recognized gesture image. The target interaction control response area is an area capable of responding to a function corresponding to the target interaction control response information.

In this embodiment, the corresponding function information is determined according to the current state information of the smart terminal, and the corresponding target interaction control response information is generated according to the function information. The corresponding interaction control response information can be generated according to the current operating state of the smart terminal, and thus is convenient for the user to perform a corresponding operation according to the current operating state of the smart terminal, which further improves the convenience of operation.

In one embodiment, after the step S130, the method further includes: detecting a gesture operation acting on the target position, and triggering a corresponding interaction control instruction according to the gesture operation; and controlling the smart terminal to perform a corresponding operation according to the interaction control instruction.

The interaction control response area includes a plurality of interaction control response sub-areas, and each interaction control response sub-area corresponds to a different interaction control instruction. When the corresponding interaction control response sub-area is triggered, the corresponding interaction control instruction can be triggered to control the smart terminal to perform the corresponding operation.

Specifically, when the interaction control response area is activated, a user gesture motion trajectory is detected or a touch operation corresponding to each interaction control response sub-area is detected. When the user gesture motion trajectory is detected as a preset gesture trajectory, the interaction control instruction corresponding to the interaction control response sub-area to which the current gesture motion trajectory corresponds is acquired. For example, the interaction control response information corresponding to the interaction control response area is to control increase and decrease in volume and switching of programs. When the user gesture motion trajectory is detected as swinging to the left, a volume increasing instruction is triggered to control the smart terminal to display the volume information and increase the corresponding volume. When the user gesture motion trajectory is detected as swinging upward, a program switching instruction is triggered to control the smart terminal to display a program list and switch the display interface to the display interface corresponding to a next program following the current program.

Further, the corresponding interaction control instruction may also be generated according to the touch operation on the interaction control response sub-area. For example, if the interaction control response information corresponding to the currently activated interaction control response area is to control increase and decrease in volume and switching of programs, the current interaction control response area is divided into the interaction control response sub-areas respectively corresponding to four functions, i.e., volume increasing, volume decreasing, switching to the previous program, and switching to the next program. Besides, a monitoring event is set in each interaction control response sub-area, and the user operation is monitored. When the user operates at a position in the interaction control response sub-area corresponding to the volume increasing function, and when the monitoring event corresponding to the interaction control response sub-area monitors a user operation, an corresponding volume increasing instruction is generated, and the smart terminal is controlled to display the volume information and increase the corresponding volume.

In this embodiment, when the interaction control response area is activated, a corresponding interaction control instruction is triggered according to a gesture operation acting on the interaction control response area, and the smart terminal is controlled to perform the related operation according to the interaction control instruction. The corresponding interaction control instruction is triggered according to the gesture acting on the current interaction control response area, and the smart terminal is controlled to perform the corresponding operation according to the interaction control instruction. Using the gesture to control the smart terminal without assistance from an additional tool further improves the convenience of the operation on the smart terminal.

Figure 2:
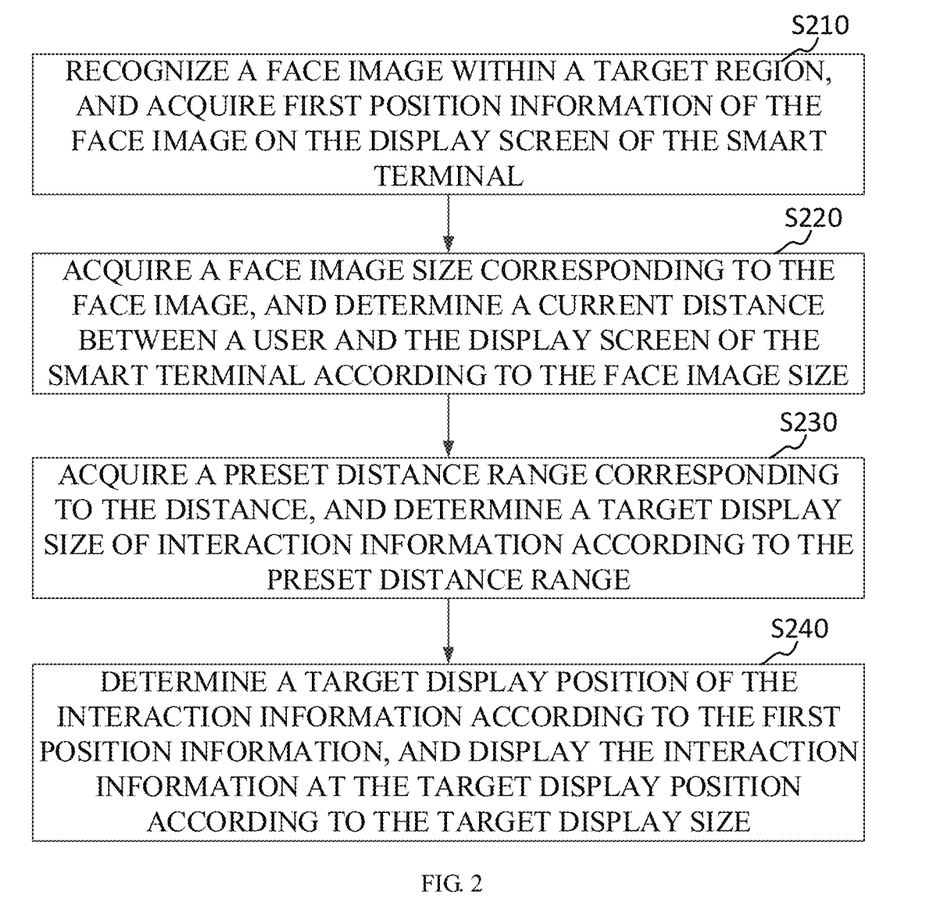
FIG. 2 is a flowchart illustrating a method for interaction position determination according to one embodiment.

As shown in FIG. 2, in one embodiment, the method for interaction position determination further includes the following content.

In step S210, a face image within a target region is recognized, and first position information of the face image on the display screen of the smart terminal is acquired.

The target region refers to an area in front of the display screen of the smart terminal, and the size of the target region is determined according to an acquisition angle of an image acquisition device. The image acquisition device may be a device included in the smart terminal, such as a camera of the smart terminal, or an external device that is connected to the smart terminal through a connection port. The gesture image is an image derived from a person's physical movement or state, such as the posture and state of a person's hand.

Specifically, an image acquisition device is used to acquire a face image. When the user's face is within the target region of the acquisition device, the acquisition device automatically searches for and captures the user's face image, recognizes the face image according to the facial features in the acquired face image and determines the position of the face image on the display screen of the smart terminal.

Further, the operation of recognizing the face image information may be performed after or before recognizing the gesture image, or may be performed simultaneously with the operation of recognizing the gesture image.

In step S220, a face image size corresponding to the face image is acquired, and a current distance between a user and the display screen of the smart terminal is determined according to the face image size.

The face image size refers to the size of the face image on the display screen of the smart terminal.

Specifically, the image acquisition device acquires a face image, projects the acquired face image onto the display screen for displaying, and acquires the size of the face image currently recognized within the target region. The current distance between the user and the display screen of the smart terminal is calculated according to the imaging principle of the image acquisition device and the face image size.

For example, the size of the current face image in the camera is acquired according to the imaging principle of the camera, and the distance between the user and the camera is acquired according to the focal length of the camera. The distance between the user and the display screen of the smart terminal is acquired according to the relationship between the camera and the display screen of the smart terminal. For example, if the camera is installed on the display screen of the smart terminal, the distance between the user and the camera is the distance between the user and the smart terminal.

In step S230, a preset distance range corresponding to the distance is acquired, and a target display size of interaction information is determined according to the preset distance range.

The preset distance range is the range of the distance from the user to the display screen of the smart terminal. The preset distance range may be a plurality of separate distance thresholds or a plurality distance ranges. Each preset distance range may be set as required. Interaction information refers to information displayed on the display screen of a smart terminal for interacting with the user, such as prompt information such as text or picture or the like in the smart terminal. The prompt information may be non-operable display information or operable information. After the smart terminal performs the corresponding operation according to the interaction control instruction, the smart terminal can display the interaction information corresponding to the current state of the smart terminal. The display size refers to the size of the interaction information to be displayed.

Specifically, the information display size corresponding to each preset distance range is established in advance. For example, when the distance is within the first preset distance range, the interaction information is displayed in a default size. When the distance is larger than the first preset distance range and less than the second preset distance range, the interaction information is displayed in a size doubled to the default size. When the distance is larger than the second preset distance range, the interaction information is display in a size three times as the default size. When the distance is smaller than the first preset distance range, the interaction information is displayed in a size reduced one time over the default size. The interaction information display size can be reduced or enlarged as the user moves.

It should be noted that a plurality of preset distance ranges and corresponding magnification or reduction factors may be set as required, and the preset distance range may also be set arbitrarily as required.

The current distance between the user and the display screen of the smart terminal is acquired, the preset distance range interval corresponding to the current distance is determined, and the corresponding interaction information display size is determined according to the preset distance range.

In Step S240, a target display position of the interaction information is determined according to the first position information, and the interaction information is displayed at the target display position according to the target display size.

Specifically, when the face image is acquired, the current position information of the face image on the display screen of the smart terminal is acquired, and a target display position of the interaction information is determined according to the current position information of the face image. For example, the position information corresponding to a person's eye is acquired as the target display position according to the current position information of the face image on the display screen of the smart terminal, and the text or picture prompt information is displayed at the position of the person's eye corresponding to the face image, which is convenient for users to view.

In other embodiments, if no face image is detected and only a gesture image that activates the interaction control response area is detected, the target display position of the interaction information is determined according to the current information position of the gesture image. For example, the text or picture prompt information is displayed on the current position corresponding to the gesture image, which is convenient for users to view.

Further, in other embodiments, on the basis of the detection of the face image, the display position of the interaction information is determined according to the combination of the face image and the gesture image. For example, the interaction information is displayed at a middle position between the position of the face image and the position of the gesture image, which is convenient for users to view and operate.

The interaction information is adjusted to a size corresponding to the target display size, and the interaction information is displayed at the target display position in the target display size.

In this embodiment, the face image information within the target region is recognized, and the position information corresponding to the face image is determined. The distance between the user and the display screen is determined according to the face image size within the target region, thereby the target display size of the interaction information is determined. The target display position of the interaction information is determined according to the position information of the face image, and the interaction information is displayed at the target display position in the target display size. The display size of the interaction information is adjusted according to the distance between the user and the display screen of the smart terminal, which facilitates the user to read the interaction information and further improves the convenience of operation.

In one embodiment, the step S240 includes: acquiring the number of the recognized gesture images within the target region; acquiring current position information corresponding to each face image when the number of the face images is more than one; and determining a target display position in accordance with a preset rule according to the current position information corresponding to each face image.

The preset rule may be determined according to the reading habits of the user and the number of the users within the target region.

Specifically, when a plurality of face images are recognized within the target region, position coordinates respectively corresponding to the face images are acquired, a middle position corresponding to the position coordinates is determined as the target display position, and interaction information is displayed at the target position. If face images are recognized on both the left and the right of the target region respectively, the interaction information is displayed at the middle position, which is convenient for the users on the left and right to view at the same time. It should be noted that the target display position may be set according to actual requirements, and may not be necessarily the middle position of the face images.

Further, the gesture information and face image information of the user may be combined. If a plurality of face image information are detected and the gesture information is detected, the text prompt information in the interaction information is displayed at the position determined by the plurality of face images together, and the operable interaction information is displayed at the position corresponding to the gesture image or all the interaction information are displayed at the position corresponding to the gesture image. If a plurality of gesture images is detected, the operable interaction information is determined to be displayed at the position of the first detected gesture image according to the chronological order of the detected gesture images. For example, if the first user of the two users makes a hand-raising gesture firstly and appears within the target region, the interaction information or the operable interaction information in the interaction information is displayed at the position corresponding to the gesture image to which the first user corresponds.

Further, when there is a plurality of users, the display size of the interaction information is determined in a preset distance range in which the distance corresponding to the user who is the farthest from the display screen of the smart terminal is included.

In this embodiment, when more than one face image within the target region is detected, the position information corresponding to each face image is acquired, and the target display position is determined according to the plurality of the position information of the face images and the corresponding preset rule. The target display position information is determined by combining the plurality of the position information of the face images, which is convenient for the plurality of users to view or operate the interaction information, and further improves the convenience of operation.

Figure 3:
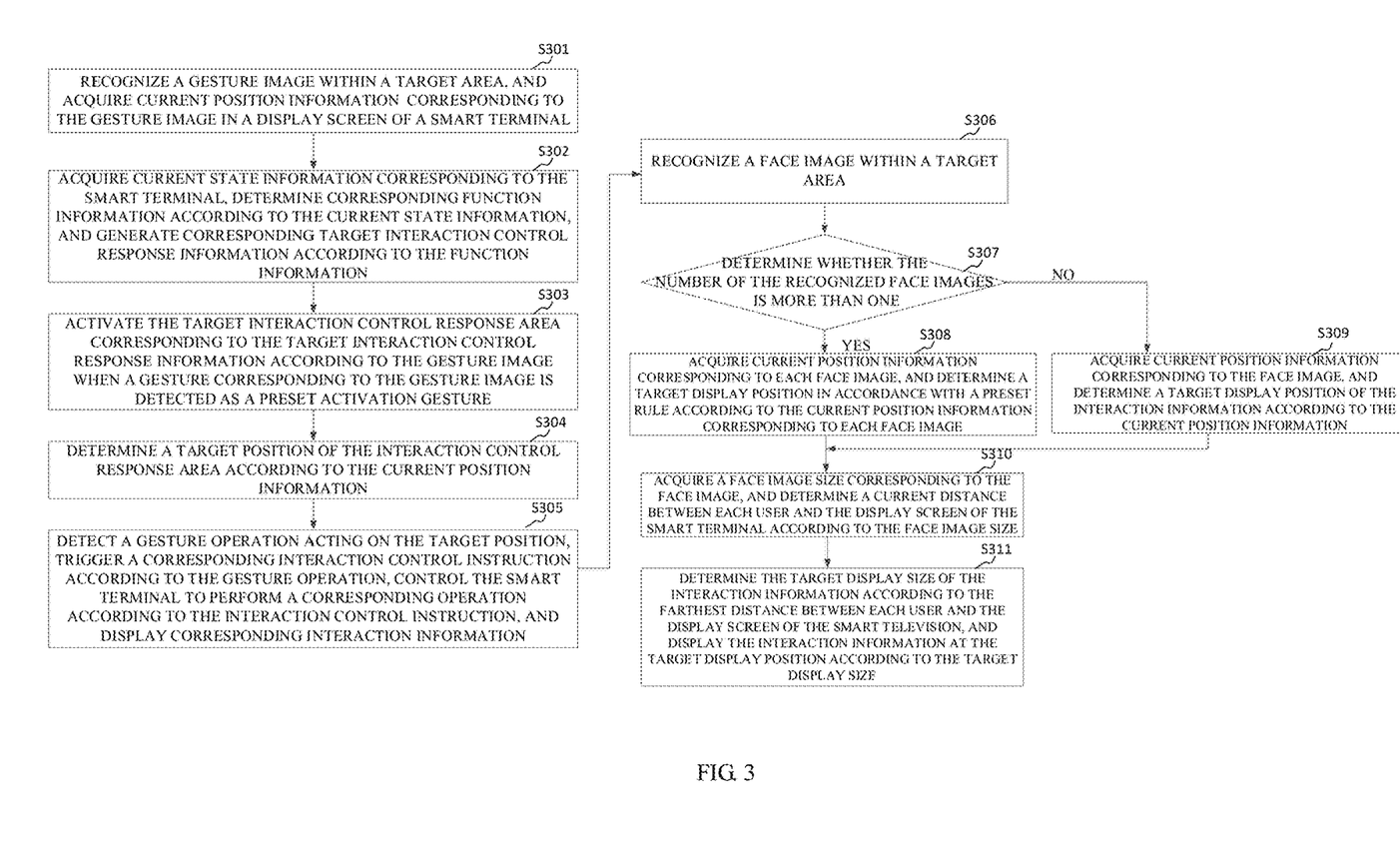
FIG. 3 is a flowchart illustrating a method for interaction position determination according to one specific embodiment.

As shown in FIG. 3, in one specific embodiment, taking a smart television as an example of the smart terminal, a method for interactive position determination is provided, including the following content.

In step S301, a gesture image within a target region is recognized, and current position information corresponding to the gesture image in a display screen of a smart terminal is acquired.

In step S302, current state information corresponding to the smart terminal is acquired, corresponding function information is determined according to the current state information, and corresponding target interaction control response information is generated according to the function information.

In step S303, the target interaction control response area corresponding to the target interaction control response information is activated according to the gesture image when a gesture corresponding to the gesture image is detected as a preset activation gesture.

In step S304, a target position of the interaction control response area is determined according to the current position information.

In step S305, a gesture operation acting on the target position is detect, a corresponding interaction control instruction is triggered according to the gesture operation, the smart terminal is controlled to perform a corresponding operation according to the interaction control instruction, and corresponding interaction information is display.

In step S306, a face image within a target region is recognized.

In step S307, it is determined whether the number of the recognized face images is more than one. If so, step S308 is performed, but if not, step S309 is performed.

In step S308, current position information corresponding to each face image is acquired, and a target display position is determined in accordance with a preset rule according to the current position information corresponding to each face image.

In step S309, current position information corresponding to the face image is acquired, and a target display position of the interaction information is determined according to the current position information.

In step S310: a face image size corresponding to the face image is acquired, and a current distance between each user and the display screen of the smart terminal is determined according to the face image size.

Specifically, when the number of the recognized face images is one, the distance between the user and the display screen of the smart television is determined directly according to the current face image size. If the number of recognized face images is more than one, each of the face image sizes is acquired to acquire the distance between each user and the display screen of the smart television.

In step S311, the target display size of the interaction information is determined according to the farthest distance of distances between the users and the display screen of the smart television, and the interaction information is displayed at the target display position according to the target display size.

Specifically, when the number of recognized face images is one, the target display size of the interaction information is determined directly according to the distance between the current face image and the display screen of the smart television. If the number of recognized face images is more than one, the farthest distance of the acquired distances between the users and the display screen of the smart television is regarded as the target distance, and the display size of the interaction information is determined according to the target distance.

Figure 4:
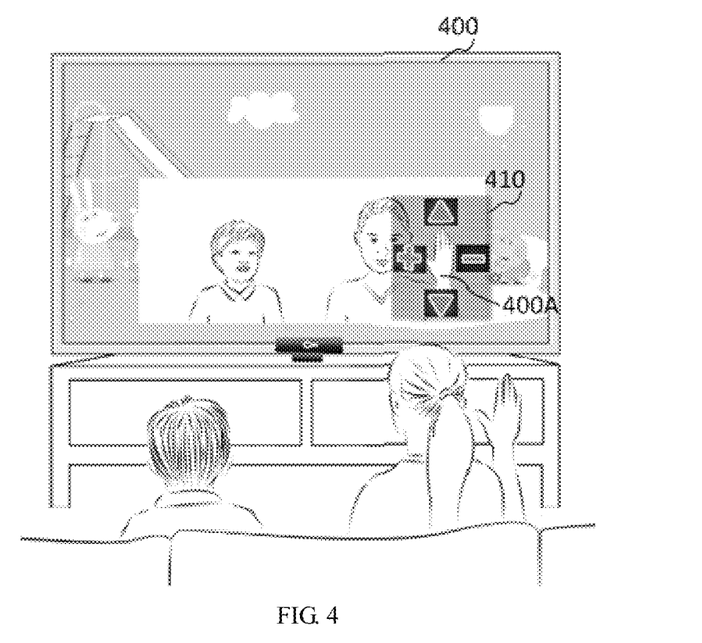
FIG. 4 is a diagram illustrating an interaction control interface of a smart terminal according to one embodiment.

As shown in FIG. 4, when the gesture image 400A is detected in the current playing state of the smart terminal, the interaction control response area corresponding to the current display screen 400 of the smart television is activated, and interface rendering is performed on the interactive display control. The corresponding menu bar information interface 410 is displayed on the display screen 400 of the smart television.

Figure 4A:
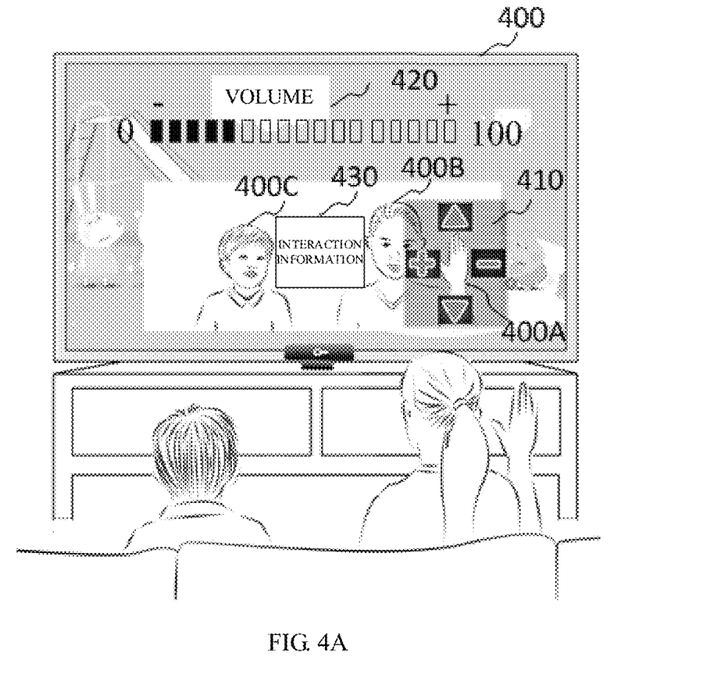
FIG. 4A is a schematic diagram illustrating an interaction control interface of a smart terminal according to one embodiment.

As shown in FIG. 4A, when it is detected that a gesture acting on the menu bar interface 410 triggers a volume decreasing instruction, the volume adjustment information 420 is displayed on the display interface of the display screen 400 of the smart terminal and the volume is decreased. Further, the face image is recognized. When the face image 400B and the face image 400C are recognized, the corresponding positions of the face image 400B and the face image 400C on the display screen are determined respectively, and the middle position between the face image 400B and the face image 400C is determined as the target display position of the interaction information. The interaction information 430 is displayed at the target display position. In other embodiments, the target display position of the interaction information may be set as required.

In this embodiment, the interaction control response area is activated by recognizing the gesture image within the target region, the target position corresponding to the interaction control response area is determined according to the current position information of the gesture image, and the position and size of the interaction information to be displayed are determined by recognizing the face image. The target position corresponding to the interaction control response area is determined according to the current position of the recognized gesture image on the display screen of the smart terminal. As the current position of the gesture image changes, the target position of the interaction control response area changes accordingly, which is convenient for users to perform operation on the interaction control response area. The interaction information changes as the position of the face image changes, and the display size of the interactive information is determined according to the size of the face image, thereby facilitating the user to view the interaction information and improving the convenience of operation.

Figure 5:
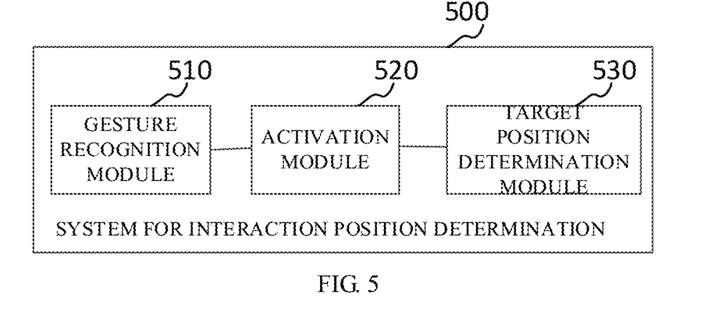
FIG. 5 is a block diagram illustrating a configuration of a system for interaction position determination according to one embodiment.

As shown in FIG. 5, in one embodiment, a system for interaction position determination 500 is provided, including the following content.

A gesture recognition module 510 is provided. The gesture recognition module 510 is configured to recognize a gesture image within a target region, and acquire current position information corresponding to the gesture image in a display screen of a smart terminal.

An activation module 520 is provided. The activation module 520 is configured to activate an interaction control response area according to the gesture image when a gesture corresponding to the gesture image is detected as a preset activation gesture.

A target position determination module 530 is provided. The target position determination module 530 is configured to determine a target position of the interaction control response area according to the current position information.

In this embodiment, a system for interaction position determination is provided. The interaction control response area is activated by recognizing the gesture image within the target region, and the target position corresponding to the interaction control response area is determined according to the current position information of the gesture image. The target position corresponding to the interaction control response area is determined according to the current position of the recognized gesture image on the display screen of the smart terminal. As the current position of the gesture image changes, the target position of the interaction control response area changes accordingly, which is convenient for users to perform operation on the interaction control response area and improves the convenience of operation.

In one embodiment, the activation module 520 is further configured to acquire current state information corresponding to the smart terminal, determine corresponding function information according to the current state information, generate corresponding target interaction control response information according to the function information, and activate the target interaction control response area corresponding to the target interaction control response information according to the gesture image.

Figure 6:
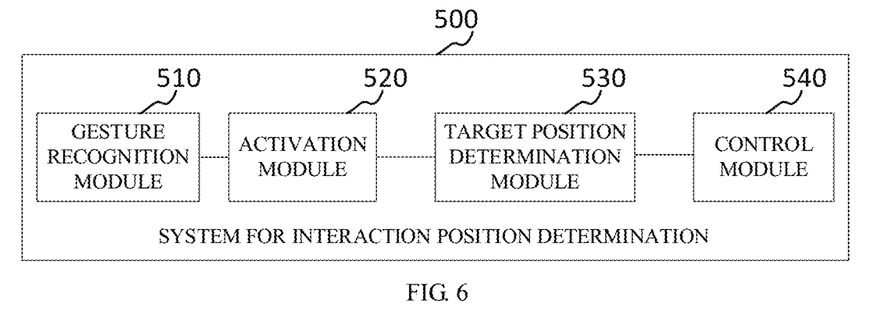
FIG. 6 is a block diagram illustrating a configuration of a system for interaction position determination according to one embodiment.

As shown in FIG. 6, in one embodiment, the system for interaction position determination 500 further includes a control module 540. The control module 540 is configured to detect a gesture operation acting on the target position, trigger a corresponding interaction control instruction according to the gesture operation, and control the smart terminal to perform a corresponding operation according to the interaction control instruction.

Figure 7:
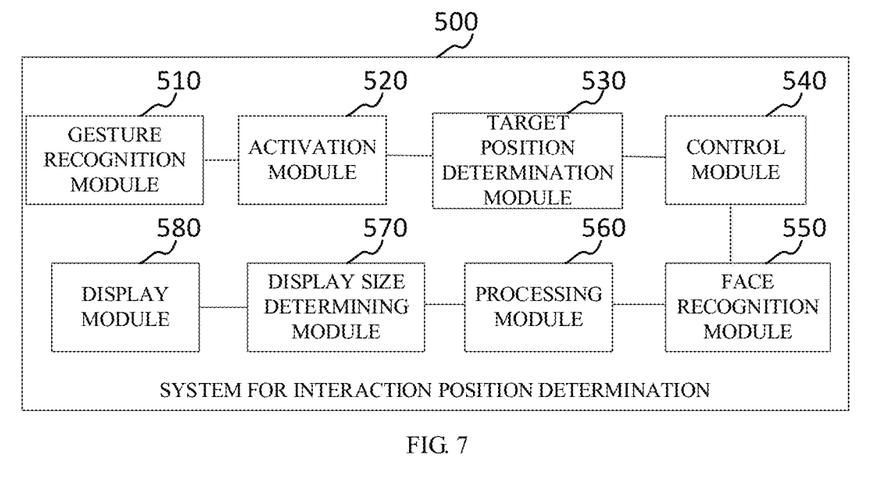
FIG. 7 is a block diagram illustrating a configuration of a system for interaction position determination according to another embodiment.

As shown in FIG. 7, in one embodiment, the system for interaction position determination 500 further includes:

a face recognition module 550 configured to recognize a face image in a target region, and acquire first position information of the face image on the display screen of the smart terminal;

a processing module 560 configured to acquire a face image size corresponding to the face image, and determine a current distance between a user and the display screen of the smart terminal according to the face image size;

a display size determination module 570 configured to acquire a preset distance range corresponding to the distance, and determine a target display size of interaction information according to the preset distance range; and a display module 580 configured to determine a target display position of the interaction information according to the first position information, and display the interaction information at the target display position according to the target display size.

In one embodiment, the face recognition module 550 is further configured to acquire the number of the recognized gesture images within the target region, and acquire current position information corresponding to each face image when the number of the face images is more than one.

The display module 580 is further configured to determine the target display position in accordance with a preset rule according to the current position information corresponding to each face image.

Figure 8:
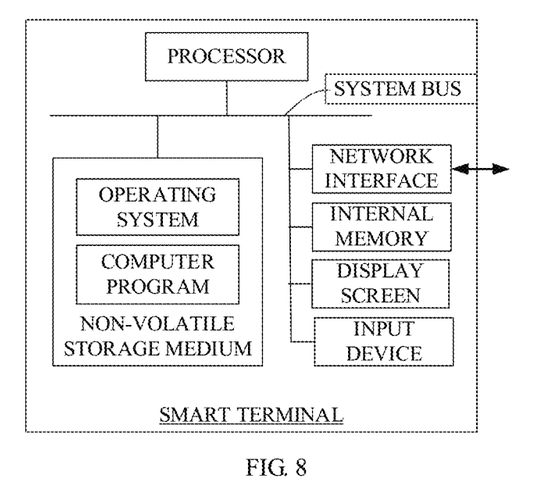
FIG. 8 is a schematic diagram illustrating an internal configuration of a smart terminal according to one embodiment.

As shown in FIG. 8, FIG. 8 is a schematic diagram illustrating an internal configuration of the smart terminal according to one embodiment. The smart terminal includes a processor, a non-volatile storage medium, an internal memory, a network interface, a display screen and an input device connected through system buses. The non-volatile storage medium of the smart terminal can store an operating system and a computer program. When the computer program is executed, the smart terminal is caused to implement the method for interaction position determination. The processor of the smart terminal is used for providing computing and control capabilities to support the operation of the entire smart terminal. The network interface is used for network communication with a server, such as sending the recognized gesture image to the server, and acquiring gesture image data stored by the server, or the like. The display screen of the smart terminal may be a liquid crystal display or an electronic ink display or the like. The input device may be a touch layer covered on the display screen, or a button, a trackball or a touchpad provided on the shell of the smart terminal, or may be an external keyboard, a touchpad, or a mouse. The smart terminal may be a mobile phone, a tablet computer, or a personal digital assistant or a wearable device.

Those skilled in the art can understand that the configuration shown in FIG. 8 is merely a block diagram of a part of the configuration related to the solution of the present application, and does not constitute a limitation on the smart terminal to which the solution of the present application is applied. The specific smart terminal may include more or fewer parts than shown in the figure, or combine certain parts, or have a different arrangement of parts.

In one embodiment, the system for interaction position determination provided in the present application may be implemented in a form of a computer program. The computer program may be run on a smart terminal as shown in FIG. 8. The non-volatile storage medium of the smart terminal may store various program modules constituting the system for interaction position determination, such as the gesture recognition module 510, the activation module 520, and the target position determination module 530 in FIG. 5. Each program module includes a computer program. The computer program is configured to cause the smart terminal to perform the steps in the method for interaction position determination of each embodiment of the present application described in the description. A processor in the smart terminal can call various program modules of the system for the interaction position determination stored in the non-volatile storage medium of the smart terminal to run a corresponding program so as to implement functions corresponding to each module of the system for interaction position determination in the description. For example, through the gesture recognition module 510 in the system for interaction position determination shown in FIG. 5, the smart terminal can recognize the gesture image within the target region and acquire the current position information on the display screen of the smart terminal corresponding to the gesture image. Through the activation module 520, when a gesture corresponding to the gesture image is detected as a preset activation gesture, the interaction control response area is activated according to the gesture image. Through the target position determination module 530, the target position of the interaction control response area is determined according to the current position information.

A computer readable storage medium with a computer program stored thereon is provided. When the computer program is executed by a processor, the processor is caused to execute the following steps: recognizing a gesture image within a target region, and acquiring current position information corresponding to the gesture image in a display screen of a smart terminal; activating an interaction control response area according to the gesture image when a gesture corresponding to the gesture image is detected as a preset activation gesture; and determining a target position of the interaction control response area according to the current position information.

In this embodiment, a computer readable storage medium is provided. The interaction control response area is activated by recognizing the gesture image within the target region, and the target position corresponding to the interaction control response area is determined according to the current position information of the gesture image. The target position corresponding to the interaction control response area is determined according to the current position of the recognized gesture image on the display screen of the smart terminal. As the current position of the gesture image changes, the target position of the interaction control response area changes accordingly, which is convenient for users to perform operation on the interaction control response area and improves the convenience of operation.

In one embodiment, when the computer program is executed by a processor, the processor is further caused to execute the following steps: acquiring current state information corresponding to the smart terminal, determining corresponding function information according to the current state information, and generating corresponding target interaction control response information according to the function information; and activating the target interaction control response area corresponding to the target interaction control response information according to the gesture image.

In one embodiment, when the computer program is executed by a processor, the processor is further caused to execute the following steps: detecting a gesture operation acting on the target position, and triggering a corresponding interaction control instruction according to the gesture operation; and controlling the smart terminal to perform a corresponding operation according to the interaction control instruction.

In one embodiment, when the computer program is executed by a processor, the processor is further caused to execute the following steps: recognizing a face image within a target region, and acquiring first position information of the face image on the display screen of the smart terminal; acquiring a face image size corresponding to the face image; determining a current distance between a user and the display screen of the smart terminal according to the face image size; acquiring a preset distance range corresponding to the distance, and determining a target display size of interaction information according to the preset distance range; and determining a target display position of the interaction information according to the first position information, and displaying the interaction information at the target display position according to the target display size.

In one embodiment, when the computer program is executed by a processor, the processor is further caused to execute the following steps: acquiring the number of the recognized gesture images within the target region; acquiring current position information corresponding to each face image when the number of the face images is more than one; and determining the target display position in accordance with a preset rule according to the current position information corresponding to each face image.

A smart terminal is provided, including one or more processors, a memory and one or more programs stored on the memory and configured to be executed by the one or more processors. The program is configured to implement the following steps: recognizing a gesture image within a target region, and acquiring current position information corresponding to the gesture image in a display screen of a smart terminal; activating an interaction control response area according to the gesture image when a gesture corresponding to the gesture image is detected as a preset activation gesture; and determining a target position of the interaction control response area according to the current position information.

In this embodiment, a smart terminal is provided. The interaction control response area is activated by recognizing the gesture image within the target region, and the target position corresponding to the interaction control response area is determined according to the current position information of the gesture image. The target position corresponding to the interaction control response area is determined according to the current position of the recognized gesture image on the display screen of the smart terminal. As the current position of the gesture image changes, the target position of the interaction control response area changes accordingly, which is convenient for users to perform operation on the interaction control response area and improves the convenience of operation.

In one embodiment, one or more programs are stored on the memory and configured to be executed by the one or more processors. The program is further configured to implement the following steps: acquiring current state information corresponding to the smart terminal, determining corresponding function information according to the current state information, and generating corresponding target interaction control response information according to the function information; and activating the target interaction control response area corresponding to the target interaction control response information according to the gesture image.

In one embodiment, one or more programs are stored on the memory and configured to be executed by the one or more processors. The program is further configured to implement the following steps: detecting a gesture operation acting on the target position, and triggering a corresponding interaction control instruction according to the gesture operation; and controlling the smart terminal to perform a corresponding operation according to the interaction control instruction.

In one embodiment, one or more programs are stored on the memory and configured to be executed by the one or more processors. The program is further configured to implement the following steps: recognizing a face image within a target region, and acquiring first position information of the face image on the display screen of the smart terminal; acquiring a face image size corresponding to the face image; determining a current distance between a user and the display screen of the smart terminal according to the face image size; acquiring a preset distance range corresponding to the distance, and determining a target display size of interaction information according to the preset distance range; and determining a target display position of the interaction information according to the first position information, and displaying the interaction information at the target display position according to the target display size.

In one embodiment, one or more programs are stored on the memory and configured to be executed by the one or more processors. The program is further configured to implement the following steps: acquiring the number of the recognized gesture images within the target region; acquiring current position information corresponding to each face image when the number of the face images is more than one; and determining the target display position in accordance with a preset rule according to the current position information corresponding to each face image.

The technical features of the embodiments described above can be arbitrarily combined. In order to simplify the description, not all possible combinations of the technical features in the above embodiments have been described. However, as long as there is no contradiction in the combination of these technical features, they should be considered as the scope described in the description.

The above-described embodiments represent only a few embodiments of the present disclosure, and the description of which is specific and detailed, but is not therefore to be understood as limiting the scope of the present disclosure. It should be noted that several modifications and modifications may be made to one of ordinary skill in the art without departing from the concept of the present disclosure, and all of which fall within the scope of the present disclosure. Therefore, the protection scope of the present disclosure patent shall be subject to the appended claims.

What is claimed is:

1. A method for interaction position determination comprising:
   recognizing a gesture image within a target region in front of a display screen of a smart terminal;
   acquiring current position information corresponding to a face detected in the recognized gesture image;
   in response to detecting a hand gesture in the recognized gesture image as a preset activation gesture:
      determining, based on the current position information, a target position of an interaction control response area configured to receive a user operation to trigger an instruction corresponding to the user operation;
      activating the interaction control response area according to the recognized gesture image at the target position;
      displaying function response information corresponding to the activated interaction control response area on the display screen of the smart terminal; and
      changing the target position of the interaction control response area to receive the same user operation to trigger the same instruction as the current position information changes in response to detecting the face in a subsequently recognized gesture image.

2. The method according to claim 1, wherein the activating the interaction control response area according to the hand being recognized in the gesture image comprises:
   acquiring current state information corresponding to the smart terminal;
   determining corresponding function information according to the current state information;
   generating corresponding target interaction control response information according to the function information; and
   activating a target interaction control response area corresponding to the target interaction control response information according to the hand being recognized in the gesture image.

3. The method according to claim 1, after determining the target position of the interaction control response area according to the current position information, further comprising:
   detecting a hand gesture operation acting on the target position;
   triggering a corresponding interaction control instruction according to the hand gesture operation; and
   controlling the smart terminal to perform a corresponding operation according to the interaction control instruction.

4. A non-transitory computer readable storage medium with a computer program stored thereon, wherein when the computer program is executed by a processor, the processor is caused to execute the method according to claim 1.

5. A smart terminal, comprising one or more processors, a memory and one or more programs stored on the memory, wherein when the one or more programs are executed by the one or more processors, the smart terminal is caused to:
   recognize a gesture image within a target region in front of a display screen of a smart terminal;
   acquire current position information corresponding to a face detected in the recognized gesture image;
   in response to detecting a hand gesture in the recognized gesture image as a preset activation gesture:
      determine, based on the current position information, a target position of an interaction control response area configured to receive a user operation to trigger an instruction corresponding to the user operation;
      activate the interaction control response area according to the recognized gesture image at the target position;
      display function response information corresponding to the interaction control response area on the display screen of the smart terminal; and
      change the target position of the interaction control response area to receive the same user operation to trigger the same instruction as the current position information changes in response to detecting the face in a subsequently recognized gesture image.

6. The smart terminal according to claim 5, wherein when the one or more programs are executed by the one or more processors, the smart terminal is further caused to:
   acquire current state information corresponding to the smart terminal;
   determine corresponding function information according to the current state information;
   generate corresponding target interaction control response information according to the function information; and
   activate a target interaction control response area corresponding to the target interaction control response information according to the hand being recognized in the gesture image.

7. The smart terminal according to claim 5, wherein when the one or more programs are executed by the one or more processors, the smart terminal is further caused to:
   detect a hand gesture operation acting on the target position;
   trigger a corresponding interaction control instruction according to the hand gesture operation; and
   control the smart terminal to perform a corresponding operation according to the interaction control instruction.

* * * * *